(12) United States Patent
Liebowitz et al.

(10) Patent No.: US 9,335,551 B2
(45) Date of Patent: May 10, 2016

(54) WELDING TECHNIQUES USING MULTI-WAVELENGTH BEAM COMBINING SYSTEMS

(71) Applicant: TeraDiode, Inc., Wilmington, MA (US)

(72) Inventors: Jay Liebowitz, Lawrence, MA (US); Bien Chann, Merrimack, NH (US)

(73) Assignee: TeraDiode, Inc., Wilmington, MA (US)

( * ) Notice: Subject to any disclaimer, the term of this patent is extended or adjusted under 35 U.S.C. 154(b) by 0 days.

(21) Appl. No.: 14/093,409

(22) Filed: Nov. 29, 2013

(65) Prior Publication Data

US 2015/0253577 A1 Sep. 10, 2015

Related U.S. Application Data

(60) Provisional application No. 61/730,541, filed on Nov. 28, 2012.

(51) Int. Cl.
*G02B 27/10* (2006.01)
(52) U.S. Cl.
CPC ................................. *G02B 27/1006* (2013.01)

(58) Field of Classification Search
CPC .... G02B 27/1006; G02B 27/10; G02B 27/09; G02B 27/0905; G02B 27/0916; G02B 27/0922; G02B 29/0938
See application file for complete search history.

(56) References Cited

U.S. PATENT DOCUMENTS

2013/0201560 A1 * 8/2013 Dueck ........................... 359/569

* cited by examiner

*Primary Examiner* — Joseph P Martinez
(74) *Attorney, Agent, or Firm* — Morgan, Lewis & Bockius LLP

(57) ABSTRACT

A system and method for decreasing the optical pathway length, varying the characteristics of a WBC system. Through the various embodiments and techniques described herein, high-brightness multi-wavelength output systems may be combined into a single laser system to achieve a more efficient and a higher quality weld between two weld partners. Additionally, the present disclosure provides methods and techniques that account for the differences between dissimilar metals, namely metals having dissimilar thicknesses, melting points, thermal conduciveness, and/or thermal expansion coefficients.

20 Claims, 13 Drawing Sheets

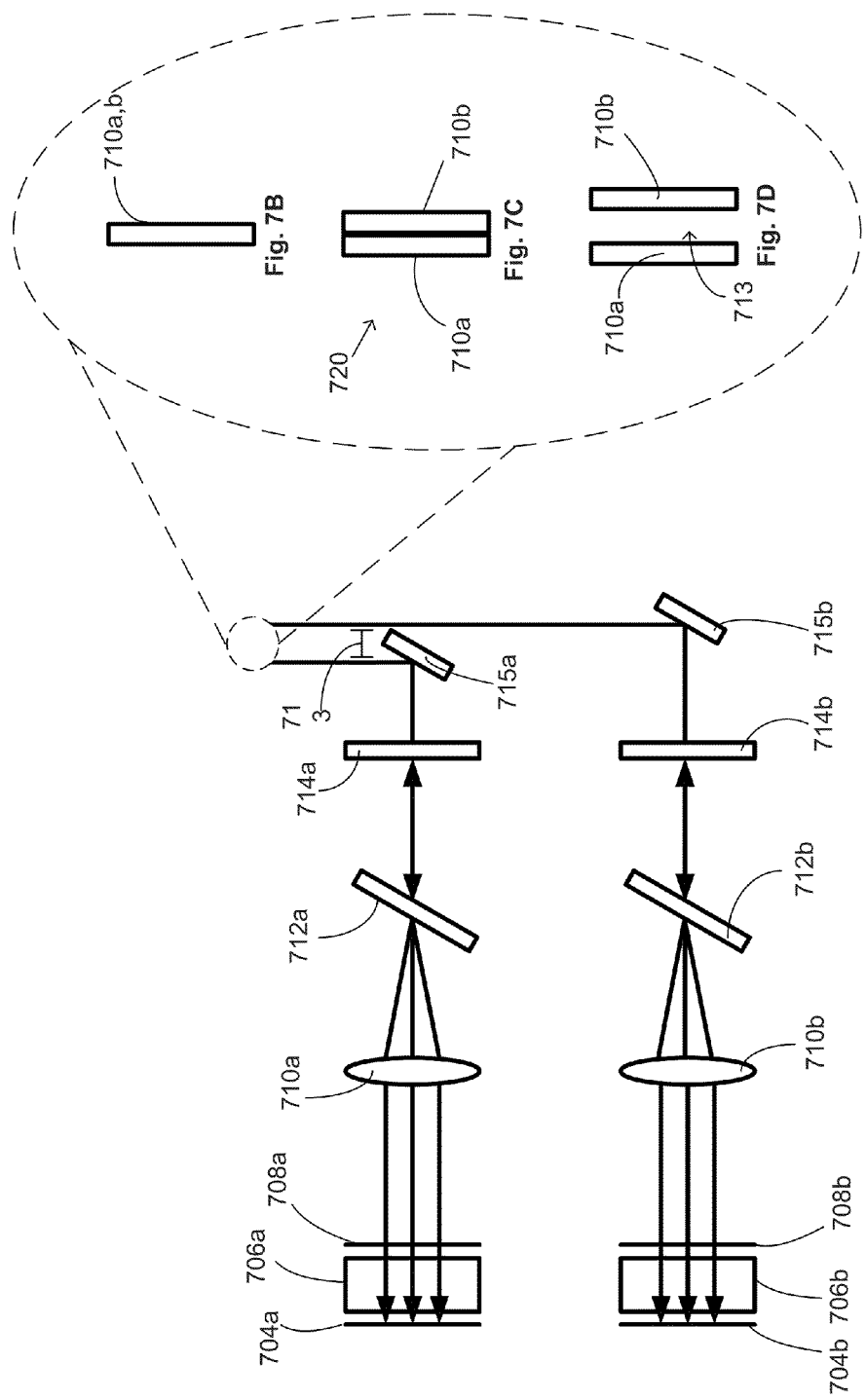

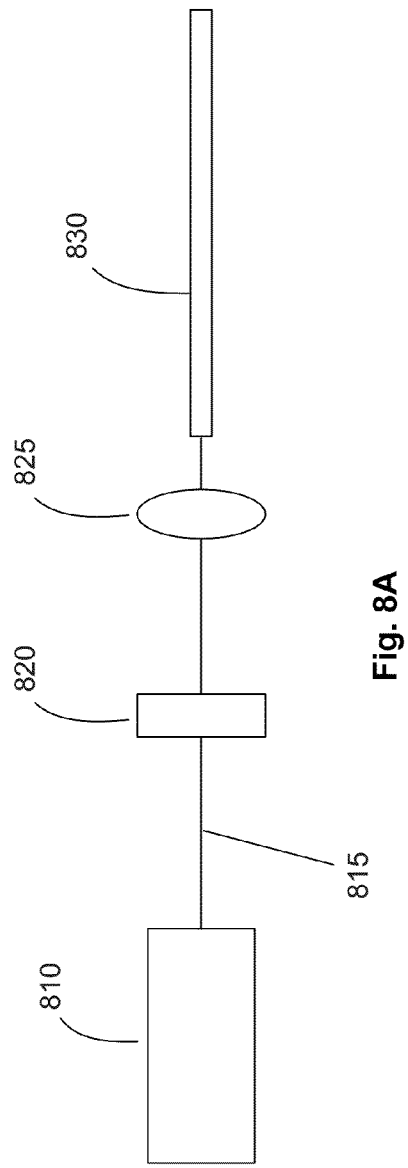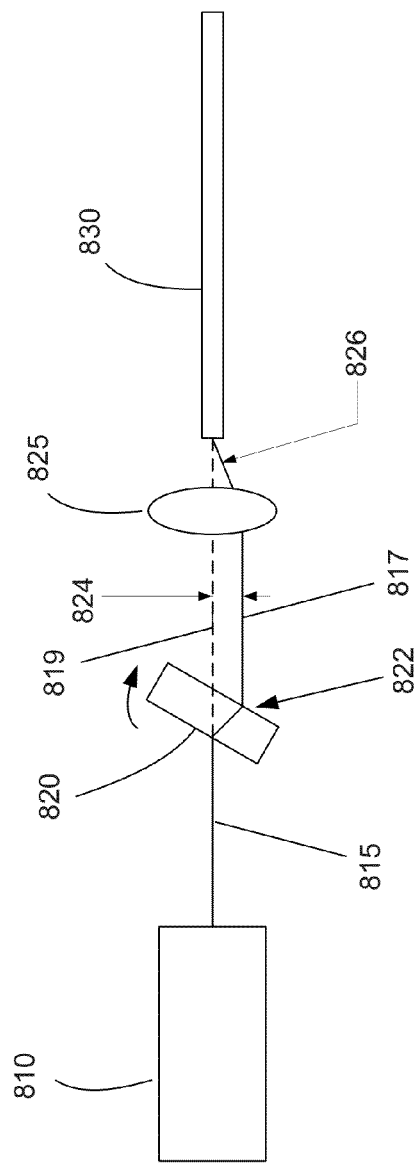

WELDING TECHNIQUES USING MULTI-WAVELENGTH BEAM COMBINING SYSTEMS

This application claims priority under 35 U.S.C. §119 to the following U.S. Provisional Patent Application, which is hereby incorporated by reference in its entirety: U.S. Ser. No. 61/730,541.

BACKGROUND OF THE INVENTION

1. Field of the Invention

The present embodiments relate generally to laser systems and more particularly to laser systems and methods used for seam welding.

2. Description of the Prior Art

High-powered laser sources are reliable and effective tools for both low and high-power industrial applications. For example, high-power laser sources are used in many applications for material processing, like annealing, welding, and soldering. Most of the available products generate an output which approximates the fundamental, or $TEM_{00}$, laser beam, having a Gaussian beam profile. $TEM_{00}$ beams are generally spherical and the intensity peaks at the center of the beam and tails off rapidly toward the edges.

One of the biggest issues in welding is the unavoidable occurrence of gaps between the welding partners. Because of the gaps between the welding partners, Gaussian beam lasers are narrow and inefficient. For example, when a Gaussian beam is used to weld a butt joint between the two welding partners, the intensity around the middle axis of the beam is lost because there is no material to vaporize or to melt. As a result, lasers having non-Gaussian beam profiles have been used.

$TEM_{01}$ laser beams, also called a doughnut beam because of their characteristic shape, produce a beam wherein the highest intensity is circularly distributed around the outside of the beam's width. While the doughnut beam has a wide seam, in welding applications, the doughnut beam is inefficient and produces undesirable results because the beam's power is not uniform across the weld gap and thus produces undesirable results.

Multi-mode laser beams, also referred to as a top-hat spread beam, produce a beam wherein the highest intensity is circularly distributed across a substantial portion of the beam's width. While the top-hat beam has a wide seam and produces a mostly-uniform beam, the beam is circular and the power density decreases quadratically with distance from the weld-gap. As a result, welding processes must be designed based on minimum energy needed at the edge of weld width to avoid causing thermal damage. Further, the top hat beam produces excess power in the center of the weld and the power outside of the weld zone generally causes distortion which, in turn, requires extra mass or compensating processing steps.

Carbon dioxide ($CO_2$) lasers can produce an elliptical beam profile that may be used in welding applications, however, in such processes there is poor absorption by the welding partners as an amount of radiation is absorbed by the plasma generated from the weld surface. In order to suppress the plasma, $CO_2$ lasers consume Helium, which is becoming increasingly expensive in the marketplace. $CO_2$ lasers also have poor wall-plug efficiency.

Occasionally, it is desirable to weld two dissimilar metals. A successful weld between dissimilar metals is one that is as strong as the weaker of the two metals being joined, i.e., possessing sufficient tensile strength and ductility so that the joint will not fail in the weld. However, metals having dissimilar characteristics such as a different thickness, melting point, thermal conduciveness, or thermal expansion coefficient can create problems. The chance for problems grows when more of these conditions are present at the same time. If not performed properly and with great care, one metal may be over heated and the weld may become overly diluted or enriched in a certain component. As a result, cracking can occur when the metals form a weak or brittle alloy in the fusion zone. Currently, methods involving overlays, coatings, and filler materials are used to overcome some of the problems created when welding dissimilar methods. A need therefore exists for a welding technique wherein dissimilar metals can be joined successfully without the need of an overlay, coating, or filler material.

Each of these systems may also suffer from optimal efficiency, power, and brightness. Further, none of these systems produce a rectangular beam having a substantially uniform intensity profile across a weld gap.

The following application seeks to solve the needs and problems stated.

SUMMARY OF THE INVENTION

A wavelength beam combining system comprising a plurality of emitters, such as diode elements, are combined using a dispersive element to form a multi-wavelength beam. Each emitter in the system individually resonates, and is stabilized through wavelength specific feedback from a common partially reflecting output coupler that is filtered by the dispersive element along a beam combining dimension. Thus, producing a high brightness, power, and efficient multi-wavelength beam combining system.

In accordance with the present disclosure, the system and methods may provide a plurality of systems as described in the previous paragraph, further including at least one spacing optical element to control a gap between the beam transmitted from the first laser system and the second laser system.

The multi-wavelength beam combining laser system of claim 1, further including an optical collimating element positioned between the combining optical element and the dispersive element. a laser beam having both a uniform intensity distribution and a square or rectangular cross section. In some embodiments, the system and methods may include an optical means, or optical element(s), for converting a round beam into a beam having a square or rectangular cross section.

BRIEF DESCRIPTION OF THE DRAWINGS

FIG. 7A illustrates two separate WBC systems that combine to make one system.

FIGS. 7B-D illustrate the front view of possible beam configurations created by at least one spatial optical element.

FIGS. 8A-B illustrate an optical schematic of a variable/tunable brightness output WBC system coupled to a fiber.

DETAILED DESCRIPTION OF THE PREFERRED EMBODIMENT

Aspects and embodiments relate generally to the field of scaling laser sources to high-power and high-brightness using wavelength beam combining techniques. More particularly, methods for increasing brightness, stability, and effectiveness of wavelength beam combining systems.

Through the various embodiments and techniques described herein, high-brightness multi-wavelength output systems may be combined into a single laser system to achieve a more efficient and a higher quality weld between two weld partners. Additionally, the present disclosure provides methods and techniques that account for the differences between dissimilar metals, namely metals having dissimilar thicknesses, melting points, thermal conduciveness, and/or thermal expansion coefficients.

The approaches and embodiments described herein may apply to one and two-dimensional beam combining systems along the slow-diverging, fast-diverging, or other beam combining dimension. In addition, the techniques may apply to external and non-external (described below) cavity WBC systems.

Figure 9:
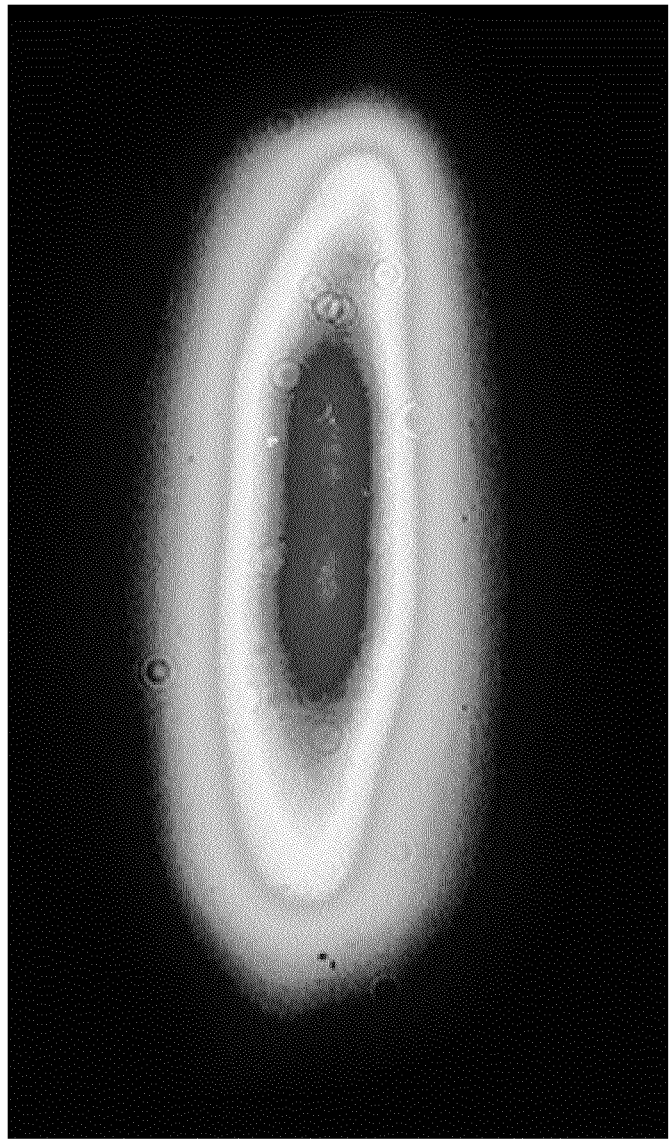
FIG. 9 is the image of a rectangular beam produced in accordance with the present disclosure.

For purposes of this application optical elements may refer to any of lenses, mirrors, prisms, diffusers, homogenizers and the like which redirect, reflect, bend, or in any other manner optically manipulate electromagnetic radiation. Additionally, the term beam includes electromagnetic radiation. Beam emitters include any electromagnetic beam-generating device such as semiconductor elements, which generate an electromagnetic beam, but may or may not be self-resonating. These also include fiber lasers, disk lasers, non-solid state lasers and so forth. Generally each emitter is comprised of a back reflective surface, at least one optical gain medium, and a front reflective surface. The term rectangular beam, as used herein, does not refer to a beam having four sides and four right-angles, rather, it refers to a beam having an elliptical shape or near elliptical shape (See FIG. 9 for an example of the shape of a rectangular beam), The optical gain medium refers to increasing the gain of electromagnetic radiation and is not limited to the visual, IR or ultraviolet portions of the electromagnetic spectrum. An emitter, may be comprised of multiple beam emitters such as a diode bar configured to emit multiple beams.

Non-Confocal WBC Systems

Figure 1A:
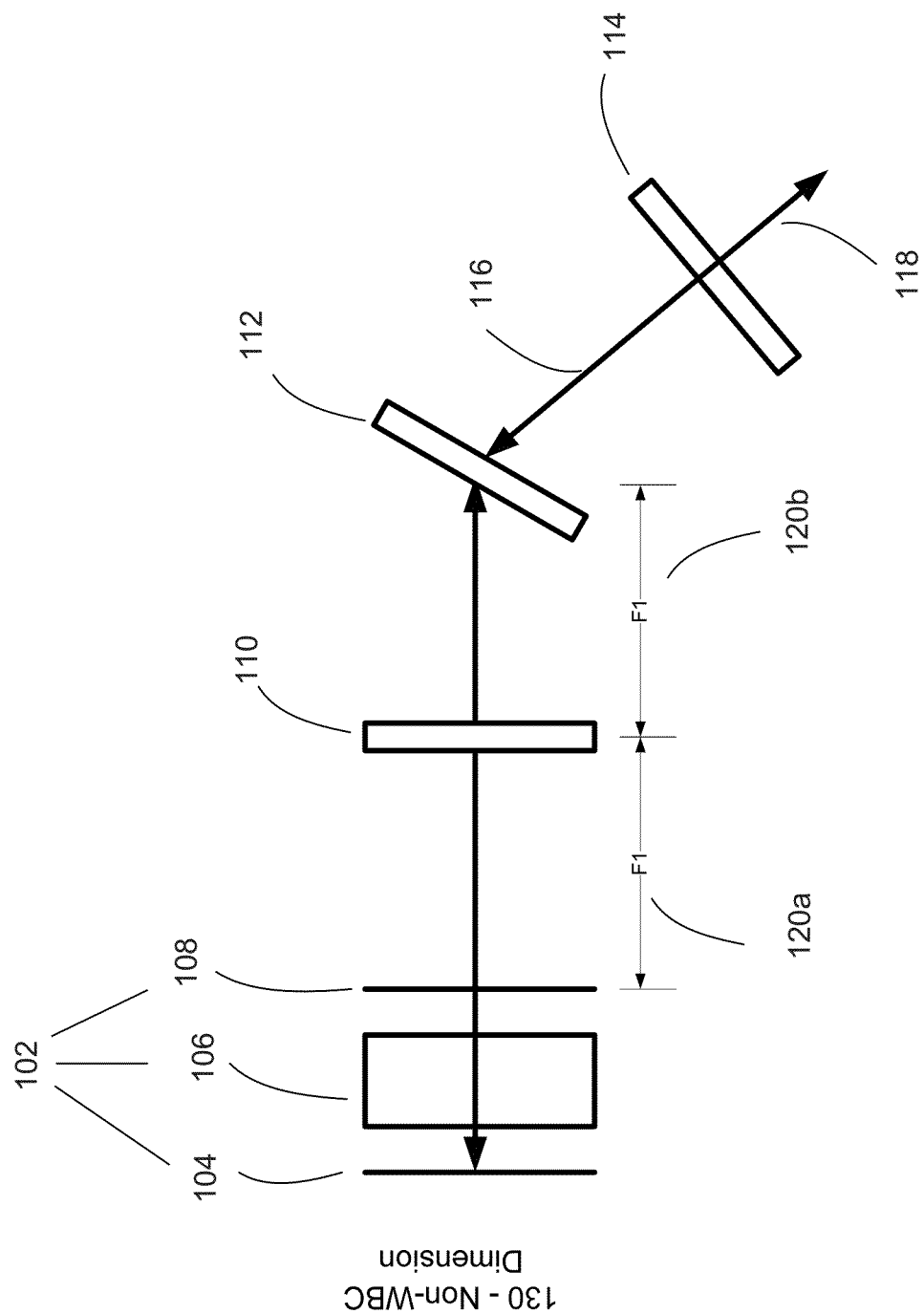
FIGS. 1A-B illustrate the beam combining and non-beam combining schematics of previous WBC systems.

As shown in FIG. 1A, external-cavity one-dimensional (1-D) wavelength beam combining (WBC) systems may consist of a one-dimensional diode bar 102 having a back reflective surface 104, a gain medium 106 with two or more diode emitters 105, a front reflective surface 108, a combining optic 110, a dispersive element 112, and a partially reflecting output coupler 114. The combining optic or lens 110 is placed a focal distance 120a away from the front reflective surface 108 of the diode bar 102 while on the back plane or other side of 110 dispersive element 112 is placed a focal distance 120b away. The output coupler is placed at a certain distance from the dispersive element 112 and reflects a portion of the generated beams (feedback) 116 to the dispersive element 112.

Figure 1B:
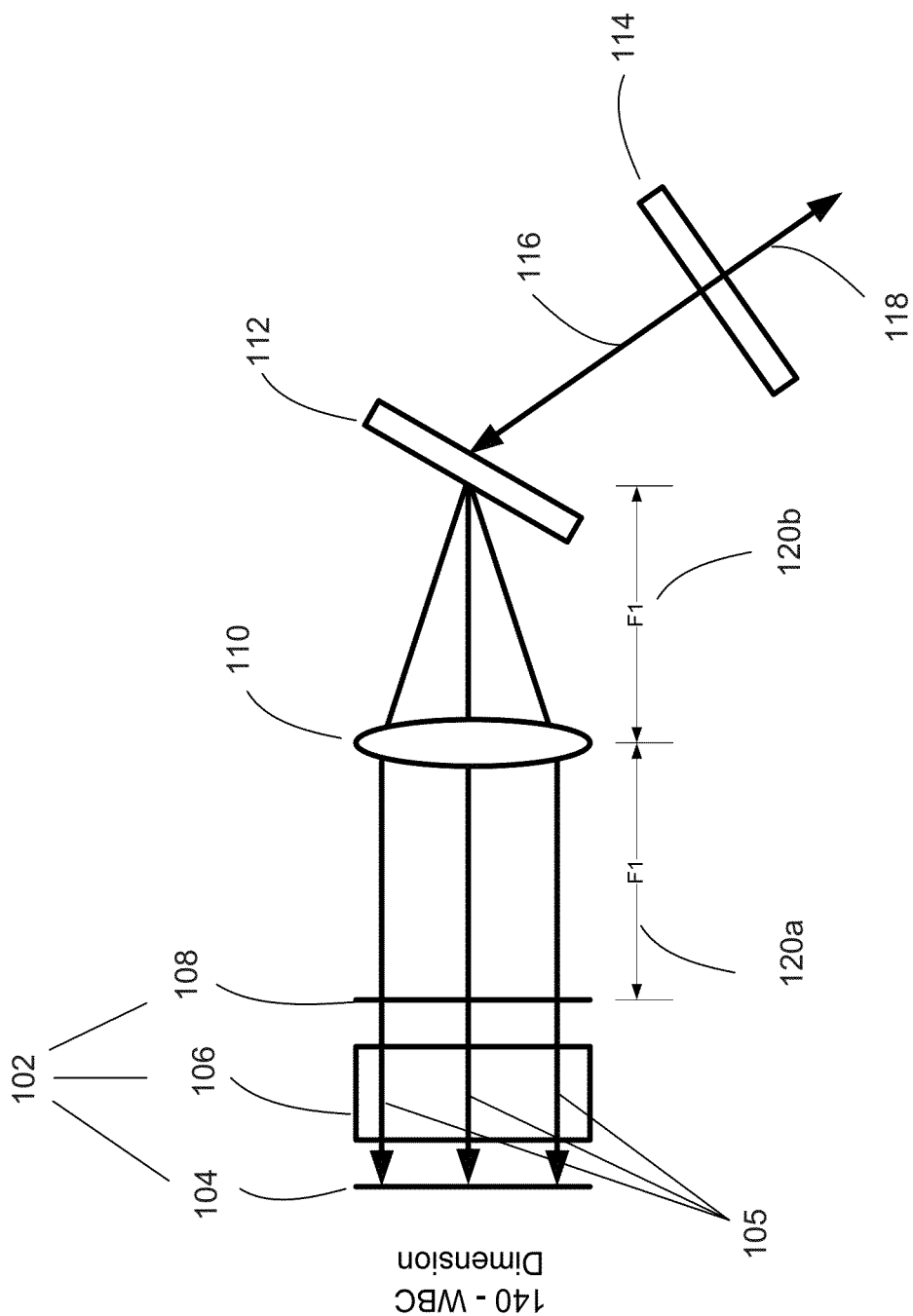

The placement of the combining lens 110 is done to accomplish two functions: The first function is to overlap all the chief rays from all the diode elements onto the dispersive element 112. The second function is to collimate each beam in both axes. See FIGS. 1A-B for a schematic view of the non-beam combining dimension view (FIG. 1A) and the beam combining dimension view (FIG. 1B). Diode bar 102 is comprised of a plurality of emitters (diode emitters) 105, a back reflecting surface 104, gain medium 106, and a front surface/facet 108.

Figure 2A:
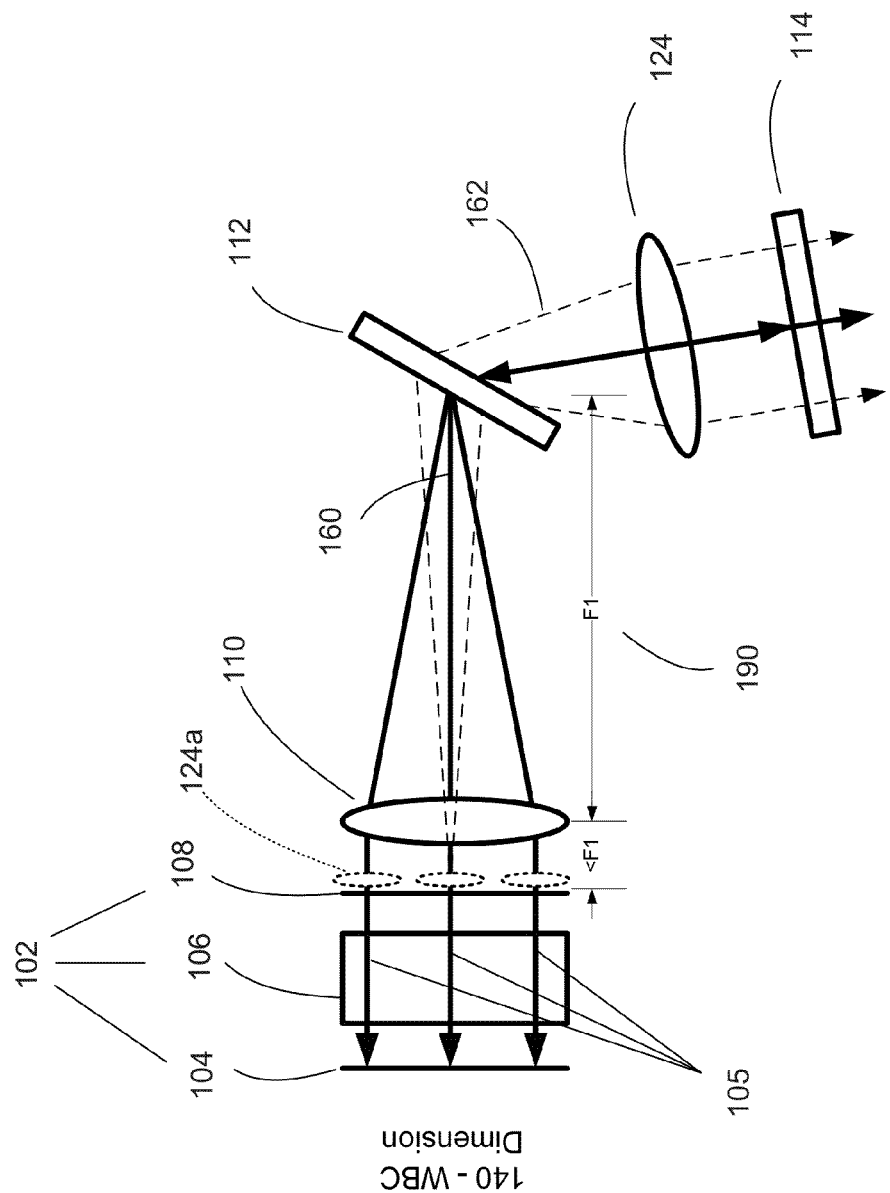
FIGS. 2A-B illustrate shortened WBC systems with non-confocal combining optics.
Figure 2B:
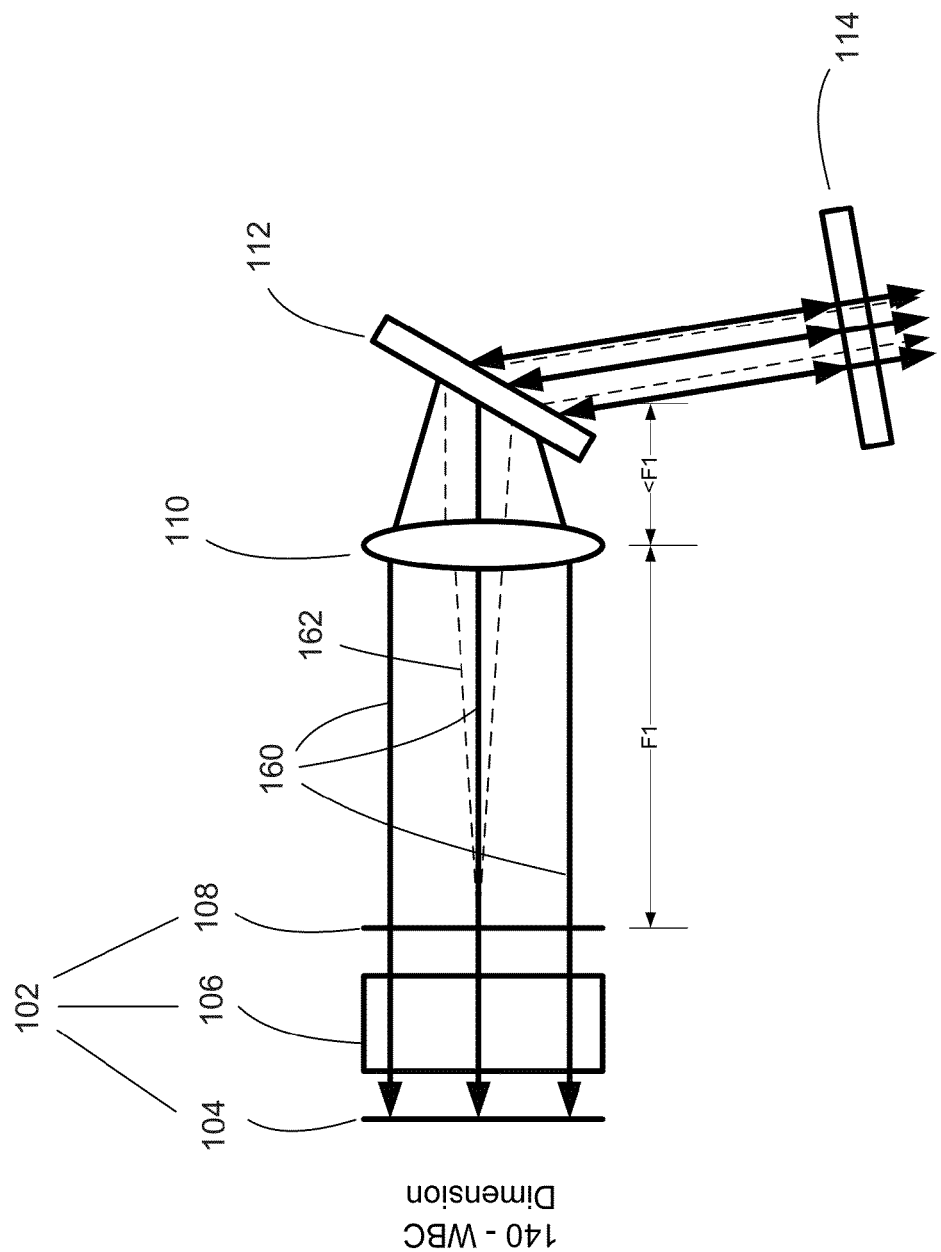

However, a more compact WBC system may be achieved, such as those shown in FIGS. 2A-B by intentionally placing the diode bar 102 or dispersive optic 112 at a position other than the focal plane of the combining optical element 110. If the combining optical element 110 is placed less than a focal length from the diode bar 102, than an additional collimating optic(s) 124 may be placed before or after the dispersive element 112 and before the partially reflective output coupler 114 as shown in FIG. 2A. This allows the optical path length between the laser bar and output coupler to be reduced by almost a full focal length of combining element 110, and particularly, when combining element 110 is placed adjacent to the front surface/facet 108 of diode bar 102.

In a variation of this embodiment, collimating optic(s) 124a may be individually placed in front of each emission point along the front surface/facet of the diode bar and before the combining optical element 110, which still results in a shortened WBC system. In this variation, the collimating optic(s) 124a may be comprised of an array of micro-optical fast-axis collimating (FAC) lenses, slow-axis collimating lenses (SAC) or combination of both. By collimating each beam it provides in part proper wavelength stabilization feedback is received into each of the diode elements. This helps each diode element produce a unique wavelength that is stabilized and less susceptible to shifting, wherein a multi-wavelength output beam profile of high brightness and power is achieved.

As shown in FIG. 2A, the dispersive element or diffraction grating is placed substantially at the back focal plane of the lens. As drawn, the first approximation, the lens with focal length F1 190 only converges the chief rays for each of the diode elements. This can be understood from the Gaussian beam transformation by a lens equation:

$$1/(s+zr^2/(s-f))+1/s''=1/f$$

s and s'' are the input and output waist locations, zr is the Raleigh range, and f is the focal length. Thus, the chief rays 160 are overlapping at the grating while each beam is still diverging 161 (shown dashed). The diverging beams may or may not be later collimated, diffused, and/or homogenized by an optical element, such as optical element 124. With all the diode element beams overlapped on the dispersive element 112, the output beam quality, is generally that of a single emitter. Again, one advantage of this system is the size may be considerably smaller as opposed to a 2× focal length spacing between diode elements and the dispersive element. In some instances cases, the beam path is reduced by almost half or more. The spacing as described herein may be slightly longer, equal to, or slightly shorter than F1.

Alternatively, an embodiment devoid of collimating optic(s) as well as optical element 124 is illustrated in FIG. 2B. Combining optical element 110 is placed a focal length from the front facet 108 and as a result collimates the light from each diode element. A reduced system size is still achieved by placing dispersive element 112 less than a focal length from combining optical element 110. The brightness of the multi-wavelength beam is still increased as compared to the initial array of beams produced by diode bar 102.

As shown in FIG. 2B, the dispersive element 112, is placed much closer than the back focal plane. Again, the penalty of such a system is there is some degradation in the output beam quality. To further illustrate, in one variation of this embodiment, it is assumed that the diode elements 102 are a single 10-mm wide bar with 47 emitters. Each emitter may have a FAC lens (not shown) and no SAC lens. Inclusion of a SAC lens does not change the results here. The focal length of the FAC lens in this variation is 910 µm. In this variation the diode bar is operating at a 1 µm wavelength. With each beam being diffraction limited along the fast axis, the typical full divergence after the FAC lens is about 1 milliradian (mrd). Along the slow-axis the beam is diverging about 100 mrd. We assume that the combining optical element 110 or transform lens has a focal length of 150 mm. The output beam quality is approximately:

$$M2 = (\theta * \pi/(4*\lambda)) * \text{sqrt}((z*x/f)^2 + 1)$$

Where $\lambda = 1$ µm, z is the distance after the lens to the grating and center at the back focal plane, x=10 mm is the dimension of the array, and A is the individual beam divergence after the grating.

Figure 3:
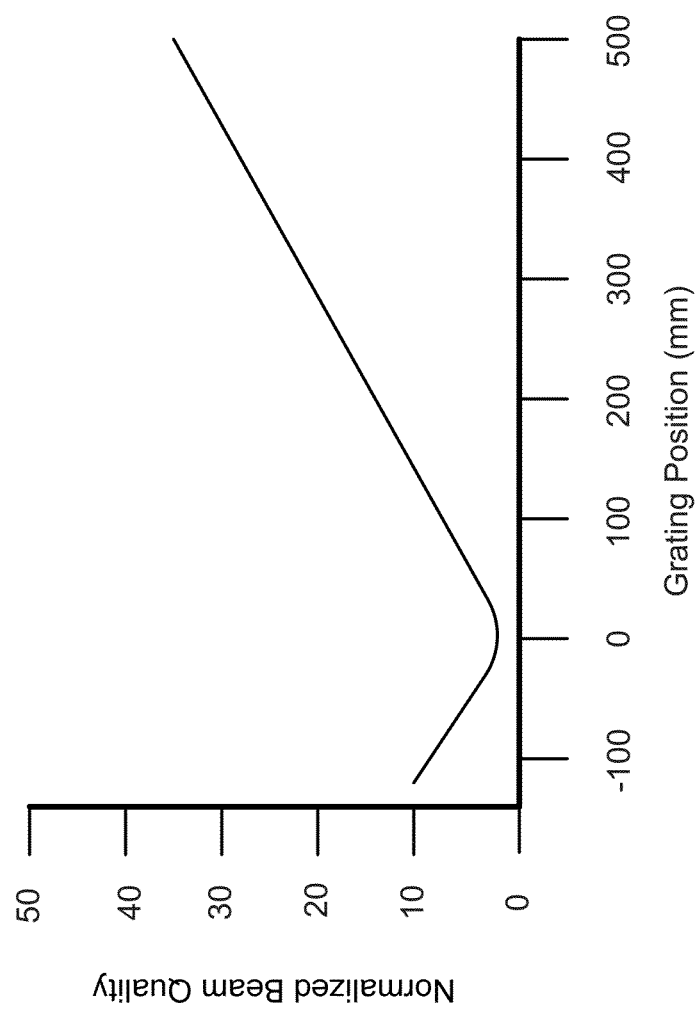
FIG. 3 is a graph showing normalized beam quality based on grating position in a non-confocal WBC system.

FIG. 3 is a graph illustrating the approximate output beam quality as a function of grating position. It is normalized to the ideal case where the grating is at the back focal plane of the optics. As expected at z=0 or the back focal plane the normalized beam quality is 1 and grows to about 33 times at z=500. The normalized free-running beam quality is about M2~47/ff=47/0.5=94, where ff is the near field fill-factor of the diode emitter. Thus, even at z=500, the beam quality of the system is still better than free a running system, one without WBC, by about 3 times. In FIGS. 1A-B the combining element 110 also acted as the collimating element. In FIG. 2A the function of the combining element 110 is primarily to focus the chief rays 160 onto the dispersive element 112 and an additional optical element 124 is placed after the dispersive element 112 generally at the focal plane of 124 to collimate, diffuse, and/or homogenize the diverging rays 162. In FIG. 2B combining element 110 is placed at approximately a focal length from the front aperture 108 and now collimates the diverging rays, but because of the shortened focal distance F1 from combining element 110 to dispersive element 112, the chief rays do not completely overlap onto each other as in previous WBC embodiments. The multi-beam output still has an increase in brightness over the prior methods, but as suggested by FIG. 3 is not at optimal brightness for the disclosed system.

Figure 2C:
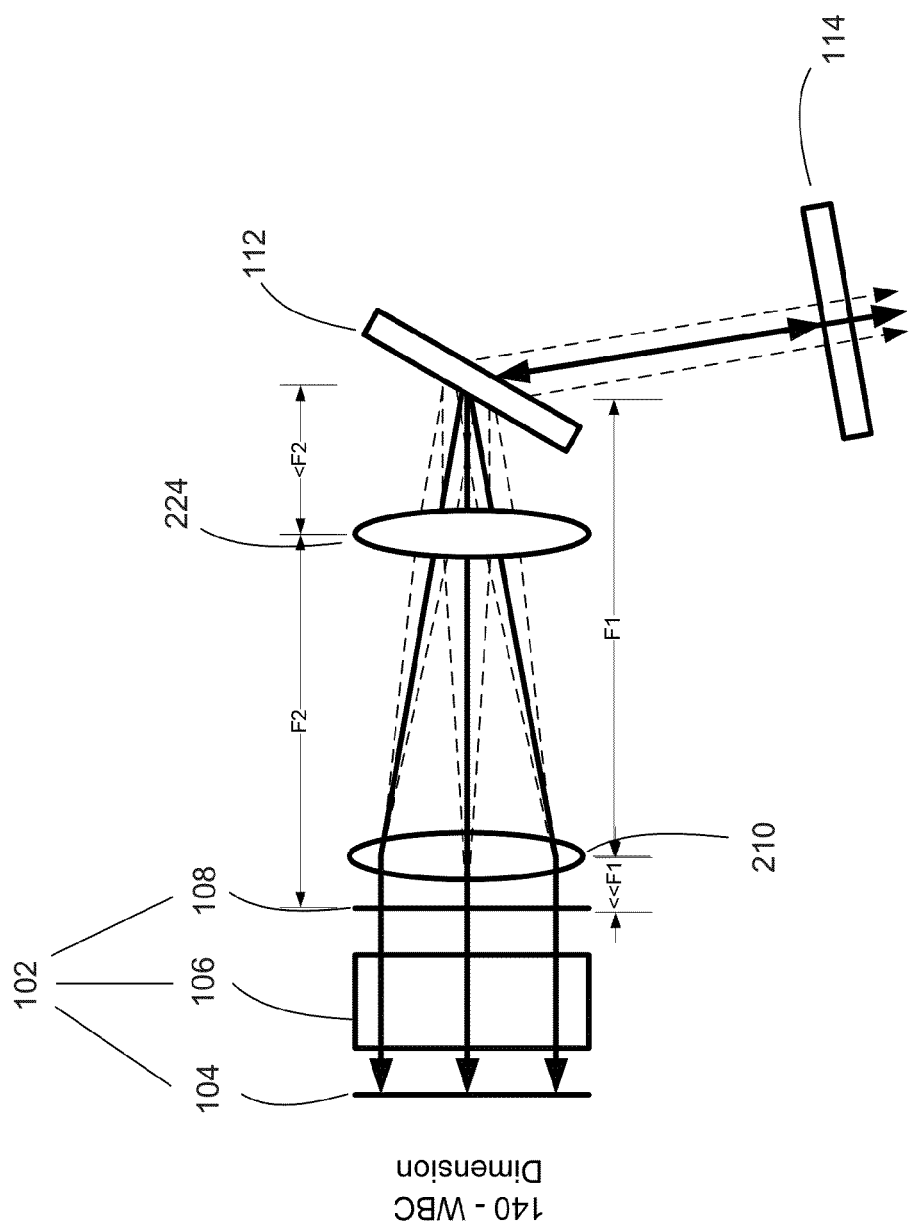
FIG. 2C illustrates a compact non-confocal dual lens WBC system.

FIG. 2C illustrates a WBC system that enables a shortened beam pathway, substantially separates the functionality of combining chief rays and collimating diverging rays into two separate optical elements (or systems) positioned before the dispersive element. Combining element 210 is positioned at a distance substantially less than its respective focal length F1 away from the front aperture 108 on one side and approximately a focal length F1 away from the dispersive element 112 on the other side. This allows combining element 210 to direct the chief rays from each diode emitter of diode bar 102 to overlap or substantially overlap on the dispersive element 112. At the same time, collimating optical element 224 is placed approximately a focal distance F2 away from the front aperture of each diode emitter on one side and at a distance less than focal length F2 from the dispersive element on the other side. Similarly, the primary function of the collimating optical element 224 is to collimate the diverging rays. One skilled in the art will readily acknowledge that both 210 and 224 have optical power along the same dimension and as a result will have some effect on the actual placement of each optical element with respect to the front aperture and dispersive element. However, this interdependency is managed in-part by the placement of each optical element substantially close to the front aperture on one side and the dispersive element on the other side. Thus, the combining optical element 210 primarily dominates the combining of the chief rays on the dispersive element 112, but is influenced by the prescription of collimating, diffusing, or homogenizing optical element 224 and vice versa.

WBC Systems Devoid of an Optical Combining Element

Figure 4:
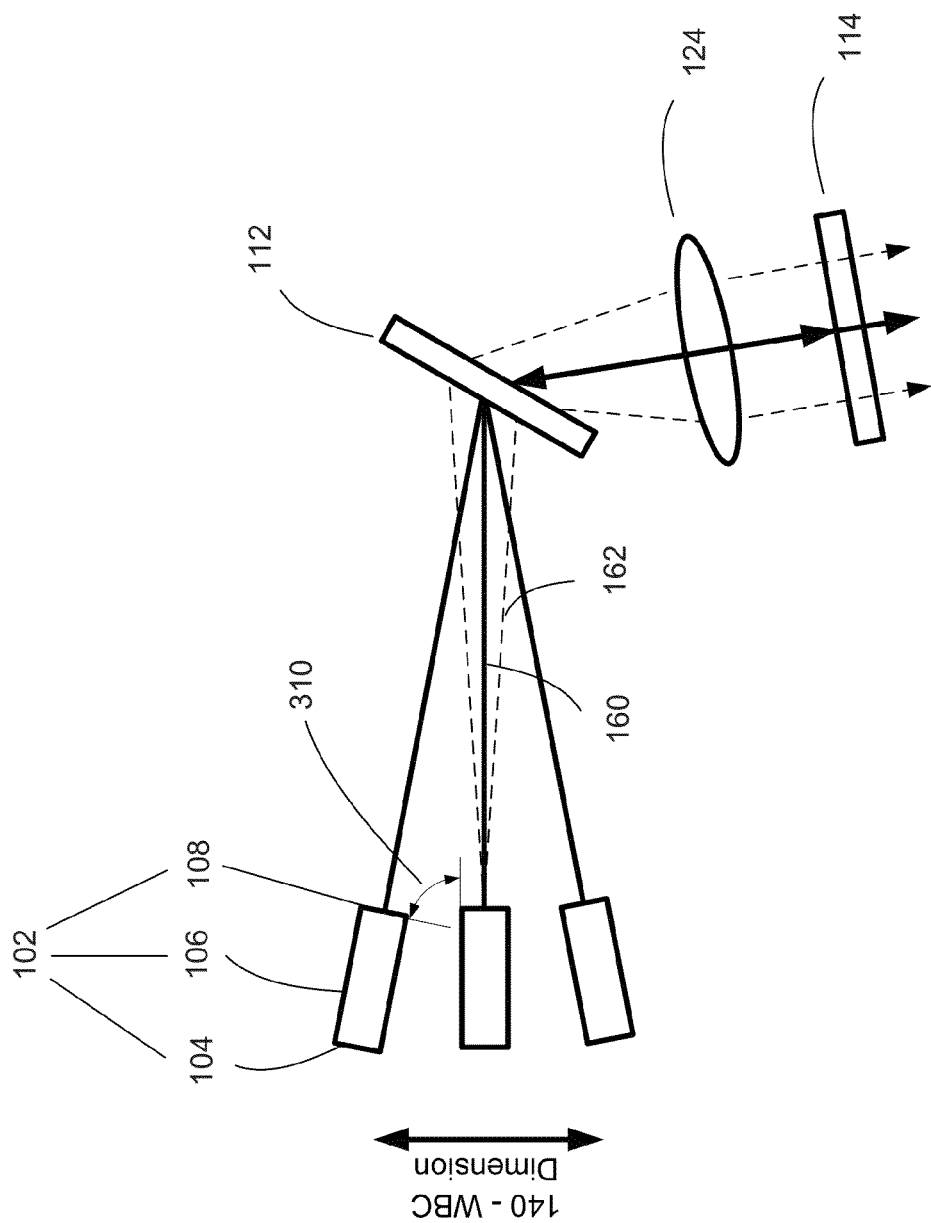
FIG. 4 illustrates a position-to-angle WBC system devoid of an optical combining element.

Other embodiments described herein also reduce system size and even the need for an optical combining element(s) through using alternative position-to-angle methods. For example, FIG. 4 illustrates a WBC system devoid of an optical combining element. Each diode bar 102 (in some cases may be comprised of only a single diode emitter) may be mechanically positioned in a manner that the chief rays (solid lines 160) exiting the diode bars 102 overlap at a common region on the dispersive element 112 as shown. (In other variations of this embodiment, and similar to FIG. 2B, the beams do not completely overlap at the dispersive element, but the spatial distance between each along a combining dimension is reduced.) The diverging rays, illustrated by dashed lines 162, are later collimated by collimating, diffusing, or homogenizing optic(s) 124 positioned between the dispersive element 112 and the partially reflective output coupler 114. (Some variations of this embodiment include replacing optic 124 with individual FAC and/or SAC lenses positioned at the front surface or facet of each diode bar) This embodiment thus increases brightness while reducing the number of optical elements required as well as reducing overall system size.

Figure 5A:
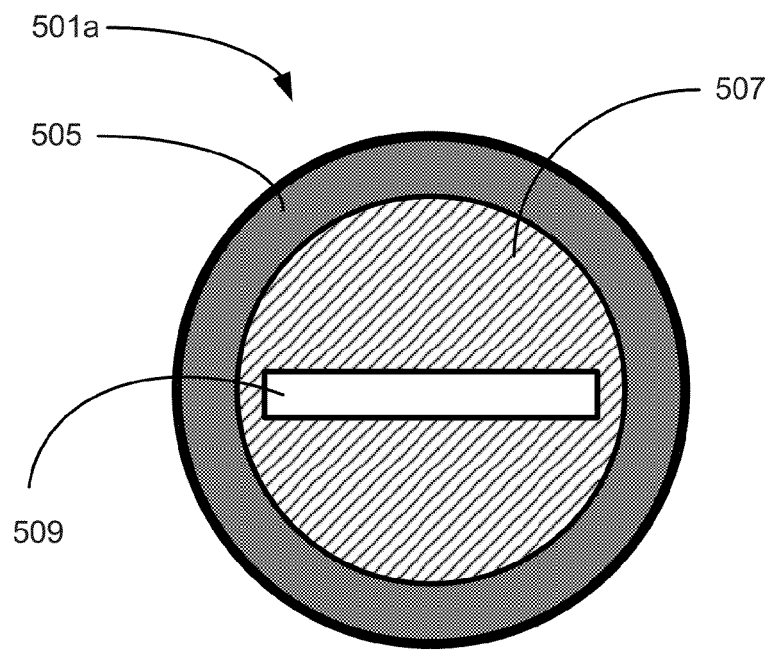
FIG. 5A-B illustrate the effect of spatial beam combining on fiber coupling.
Figure 5B:
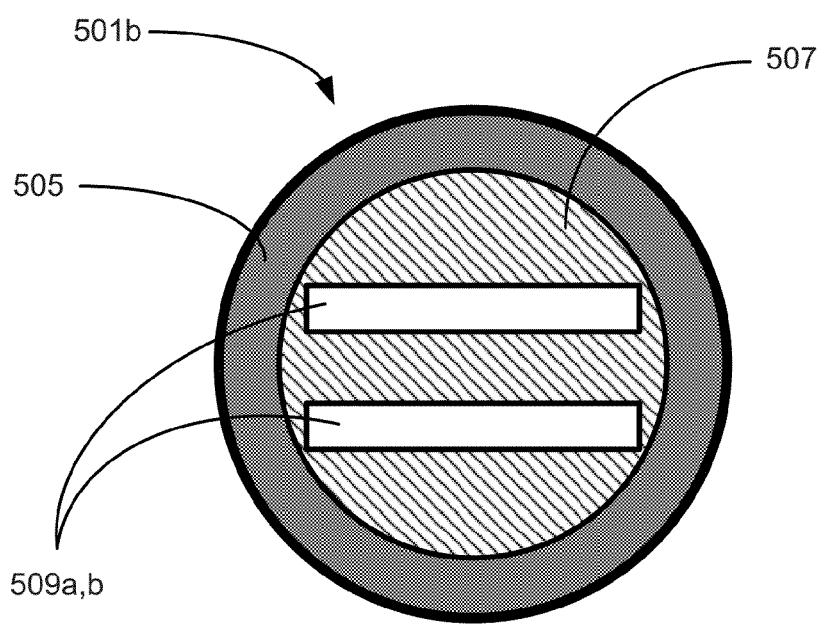

FIGS. 5A-B illustrate the effect of spatial beam combining on fiber coupling. As shown in FIG. 5A optical fiber 501 a has a cladding 505 and core 507 configured to receive a multi-wavelength beam 509. Multi-wavelength beam 509 is usually formed by combining single row (1 dimension) of diode emitters (often generated by a single diode bar) into the size of a single element configured to be received by the core 507. However, in two-dimensional or multi-row/array diode emitters configurations (comprised of in some instances multiple diode bars) a spatial combiner is used to configure a multi-wavelength beam profile that has the size of two or more original elements/emitters stacked in a single column two into a similar sized core 507 of an optical fiber 501b. For example, one bar may be comprised of 49 emitters that are reduced to approximately the size of one emitter. By stacking or arranging optically or mechanically two bars with 49 emitters each a profile 509a,b (509a and b each representing a row or diode bar) may be produce a multi-wavelength beam profiled configured to be received into an optical fiber that increases the brightness and power by a factor of 2 times.

Now referring to FIG. 7A, which shows multiple two-dimensional (2-D) wavelength beam combining (WBC) systems, each consisting of a diode bar having a back reflective surface 704a,b, a gain medium 706a,b with two or more diode emitters, a front reflective surface 708a,b, a combining optic 710a,b, a dispersive element 712a,b, and a partially reflecting output coupler 714a,b. The placement of the collecting lens 110a,b is done to accomplish two functions: The first function is to overlap all the chief rays from the diode elements onto the dispersive element 112a,b. The second function is to collimate each beam in both axes. On the non-beam combining dimension, each of the WBC systems further comprise mirror 715a,b. In some embodiments the position of the mirror may be changed automatically, manually, or a combination of the two so that that gap 713 between the two reflected beams can either increase or decrease. In additional embodiments, the gap 713 between the two reflected beams may be controlled using a spatial optical element. The gap 713 may range from 0 to 1.0 mm or more.

FIGS. 7B-D illustrate the effect of spatial beam combining on lasers operating in free space. As disclosed above, multi-wavelength beams are usually formed by combining single row (1 dimension) of diode emitters into the size of a single element. In some embodiments disclosed herein, illustrated in FIG. 7B, a single multi-wavelength beam 710a-b may be formed using two-dimensional or multi-row/array diode emitters configurations (comprised of in some instances multiple diode bars). In such embodiments, the beam produced by multi-row/array diode emitters overlap and produce a multi-wavelength beam having a beam image equivalent in size as that of a beam produced by a 1-dimensional emitter. In additional embodiments, as illustrated in FIG. 7C, the beams extracted from each of the respective diode emitters or diode bars may form two separate multi-wavelength beams 710a and 710b having a single beam image 720. More specifically, the respective beams do not overlap, but the multi-wavelength beams abut one another thereby having a beam image width equivalent to that of the widths of beam 710a and 710b, combined. In additional embodiments, as illustrated in FIG. 7D, the beams extracted from each of the respective diode emitters 710a and 710b may be spatially separate, creating two distinct beams separated by a gap 713. In such embodiments, gap 713 between beams 710a-b may range from 0 to 1.0 mm or more.

In additional embodiments, the beams 710a-b produced by the respective diode emitters may have the same or separate wavelengths, intensities, brightness, size, and any other specification commonly used to describe an electromagnetic beam.

It is also contemplated herein that one or both of the beams 710a-b may be time delayed. More specifically, one beam may power on before the other, or in the alternative, one beam may have a delayed start and power on after the other beam, based on the desired output and desired function of each beam. Additionally, in some embodiments the respective diode emitters may be pulsed. In such embodiments each of the diode emitters may pulse having the same on/off intervals/durations, they may be pulsed in an alternating manner, or they may be individually configured to pulse on and off at varying intervals and for varying durations according to the desired function for each individual emitter.

As mentioned above, automatic or manual techniques may be used to control the positioning of mirrors 715a-b or any other spatial optical element used to control whether the multi-wavelength beams overlap (FIG. 7C), whether they abut one another (FIG. 7D), or whether there is a gap between the beams (FIG. 7E).

Figure 6A:
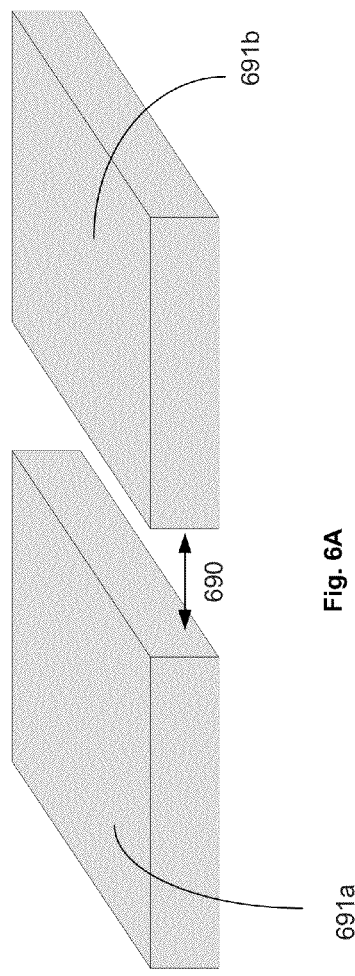
FIGS. 6A-D illustrate perspective views of two weld partners.
Figure 6B:
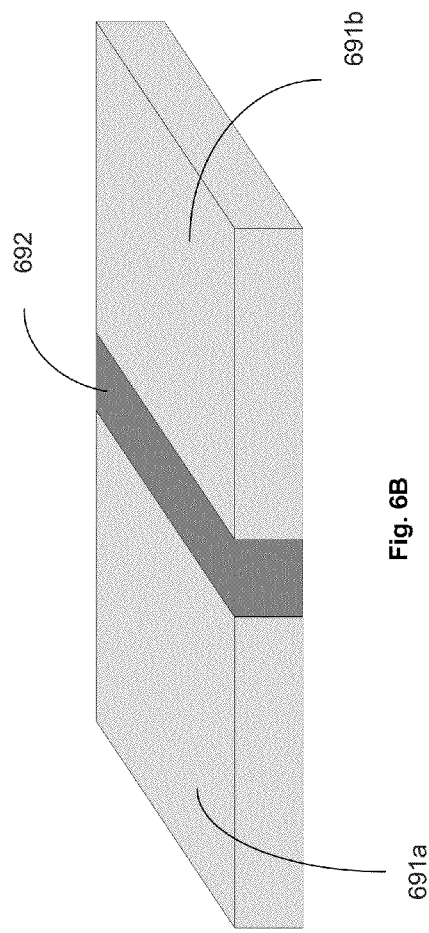
Figure 6C:
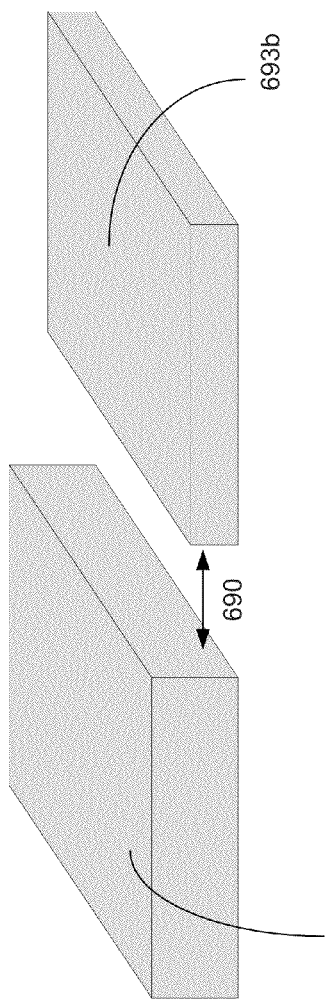
Figure 6D:
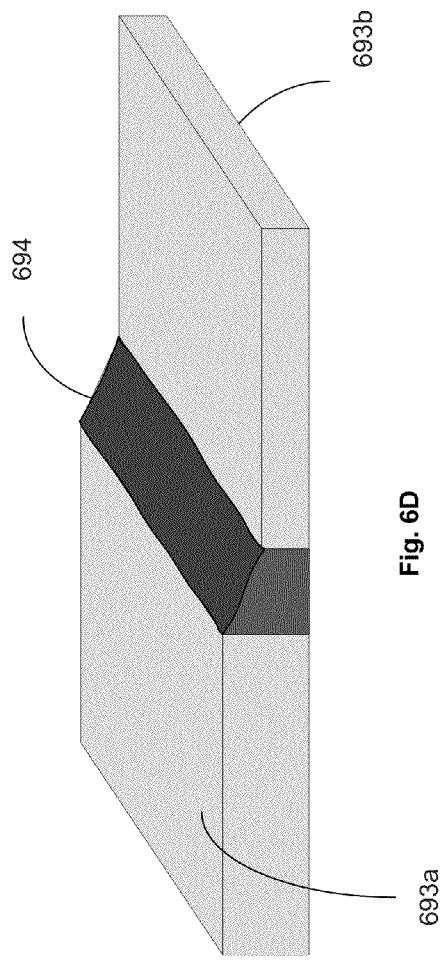

The embodiments illustrated in FIGS. 7C-E each offer different advantages that are readily apparent to one skilled in the art. When welding between dissimilar metals or between welding partners having different thicknesses, it may be advantageous to weld with two separate and distinct multi-wavelength beams. For example, as illustrated in FIGS. 6A-B when welding dissimilar metals such as aluminum 691a and steel 691b, metals that have different melting points, different thermal conductivities, and different thermal expansion coefficients, one beam may be directed toward the aluminum weld partner 691a, while the second beam may be directed toward the steel partner 691b. In such embodiments, each of the beams may be configured to best match the wavelength, intensity, brightness, or any other beam characteristic preferable when welding with each respective weld partner. As discussed above, one way of controlling these beam characteristics is timing. It is contemplated herein that the beams may be time delayed, they may pulse at predetermined intervals for predetermined durations to achieve a desired output, and in some embodiments diode bars and diode emitters may be powered off or powered on to achieve a desired power output. For example, if there are four emitters in an array that are being combined, each having a power output of 250 W and achieving a combined power of 1 kW, if it is more desirable to produce a beam having 500 W power, two of the emitters may be powered off.

Adjustable BPP

As described above, various spacing between the diode emitters, combining optical element and dispersive element have been discussed (including those systems devoid of an optical combining element). Also disclosed in FIG. 3 is a graph illustrating the normalized beam quality measured in terms of beam parameter product (BPP). The BPP of each system described herein, may be adjusted from a low BPP to a higher BPP. In laser manufacturing, cutting, and welding, various materials, thickness, type of cut and so forth require a laser to have a flexible output based on BPP. Some materials require the highest quality beam output (or lowest BPP available) to cut or weld; however, in other circumstances where the parameters of the material, cut, thickness have been altered the same high quality is insufficient to efficiently perform the desired task. Thus, the WBC system would be intentionally adjusted to reduce beam quality in order to more effectively accomplish a particular manufacturing task. Therefore, in the scope of the application, adjustable positioning of diode emitters with respect to the dispersive element, diode emitters with respect to the combining optical element, and combining optical element with respect to the dispersive element, all help to create a flexible WBC laser system to accomplish a greater range of tasks. These adjustable position configurations may include manual and real-time adjustments. E.g. thin metal applications and thick metal applications as well as the type of metal to be cut sometimes require different cutting parameters relative to beam quality. In another embodiment, in addition to linearly positioning the beams and elements along the beam combining dimension, the angular position of at least one of the beams is repositionable. This repositioning may be automated that it may occur in real time. One way of accomplishing this by placing a rotatable optical element, such as a piece of glass after the multi-wavelength output of the WBC system and prior to a fiber optical mount (FOM).

FIGS. 8A-B illustrate an embodiment incorporating a rotatable optical element 820 (or beam path adjuster) in the optical pathway 815 containing the multi-wavelength output beam from WBC system 810 to a FOM 825 configured to direct the multi-wavelength beam into fiber 830 with its associated NA and width. FIG. 8A illustrates the configuration where the rotatable optical element 820 has a surface normal to the optical pathway 815, thus allowing the optical pathway to continue on to the FOM 825 with no or minimal interference. Alternatively, rotatable optical element 820 can be positioned where the surface is offset at a non-normal angle causing the multi-wavelength beam to be redirected at 822 following a new optical path 817 that is offset by a distance 824 from the unaltered optical pathway 819. This causes the angle 826 at which the multi-wavelength beam enters fiber 830 from FOM 825 to increase. This increase in angle reduces the quality of the multi-wavelength beam. As stated, in some instances a less bright beam is actually more desirable for particular applications, thus having a tunable or adjustable WBC system may be configured to accomplish various tasks at optimal settings for those particular tasks. In some embodiments the rotatable optical element 820 may be manually adjusted while in others the rotation process may be automated. In additional embodiments not shown, additional optical elements may be implemented into the systems to shape the beam's image and/or modify its intensity profile. For example, composite fold mirrors, diffractive elements, prisms, and rotating diffusers may be used.

In yet other configurations wherein the output beam quality of the system is adjustable, the output power of each emitter may adjusted from completely off to full power output.

Beam Homogenizing and Beam Shaping

As mentioned above, in machining applications such as welding, it may be advantageous to produce a beam having a more uniform density profile and is square or rectangular in shape. Referring now to FIGS. 6A-B, one of the biggest issues in welding is the unavoidable occurrence of gaps or seams 690 between weld partners 691*a-b*. Due to the nature of the seam 690 between the welding partners 691*a-b*, when a Gaussian beam is used to weld a butt joint between the two welding partners, the intensity around the middle axis of the beam is lost because there is no material to vaporize or melt. Welding with a square or rectangular shaped laser, as disclosed herein, is a more effective and more efficient method for producing a higher quality weld 692.

In some embodiments, optical elements may be incorporated into the system to homogenize the produced beam. Composite fold mirrors, diffractive elements, prisms, and rotating diffusers may be used to control the beam's angle of refraction so the extracted beam has a uniform intensity profile.

Further, as mentioned above, the extracted beam may be the image of multiple facets. For example, a resulting beam may be the image produced from overlapping facets, parallel facets or a combination thereof, resulting in a larger image or an image having more than one separate square or rectangular output beams. In some embodiments, the polarity of the extracted beams may be the same. It is also contemplated that the polarization of the beams can be oriented in different directions relative to one another. Also in accordance with the present disclosure are embodiments wherein the polarity of the beam may be automatically or manually adjusted using an optical element, for example, a halfway plate or the like.

Exemplary Embodiments

In accordance with the present disclosure is a plurality of 2-dimensional WBC systems mounted on a stationary lasing machine, each producing a distinct beam, having a length of 4.5 mm, a width of 1.7 mm, and a power of 1 kW. An adjustable spatial optical element is configured to reflect the two distinct beams so they abut one another, producing a combined beam having a length of 4.5 mm and a combined width 3.4 mm.

An additional exemplary embodiment is a plurality of 2-dimensional WBC systems mounted on a moving/rotating lasing robot arm, each producing a distinct beam, having a length of 4.5 mm, a width of 1.7 mm, and a power of 1 kW, the first beam however being time delayed. An adjustable spatial optical element is configured to reflect the two distinct beams, leaving a gap between the two beams measuring between 0.1 and 0.3 mm.

An additional exemplary embodiment is a plurality of 2-dimensional WBC systems mounted on a moveable lasing machine, each producing a distinct beam, having a length of 4.5 mm, a width of 1.7 mm, and a power of 1 kW. An adjustable spatial optical element is configured to reflect the two distinct beams, leaving a gap between the two beams as wide as 1 mm.

In accordance with the present disclosure is a high brightness direct diode laser having a free space beam with wavelength of 970 nanometers (nm) may be used. A 970 nm, 1-micron, high brightness free space beam has many advantages for I-seam butt joint welding. Due to its relatively short wavelength, plasma shielding is minimized and the absorption in metal is higher, thereby improving the efficiency of the system. Additionally, as a result of its linear polarized beam, more light is absorbed in the direction of motion when the polarization is in that same direction, also improving efficiency. The created free space rectangular beam, when orthogonally oriented to an I-seam, maximizes the beam width and presents a uniform energy distribution, causing less thermal distortion. Having a uniform energy distribution allows for maximum throughput, as there is no longer a need to design the process based on worst case power delivery from the edges of the beam. As a result of these advantages, the disclosed 970 nm, 1-micron, high brightness free space beam can process at the same throughput as previously used methods but may only require as little as one-third (33.3%) of the power.

Traditionally in automotive welding a 500-micron diameter spot beam is used. The 500-micron spots use 6 kilowatts (kW) of power and provide an irradiance of 30.6 gigawatts per square meter (GW/m$^2$). The present disclosure provides lasing systems wherein a rectangular beam is produced imaged as 500-micron wide, and just 300-micron long, from a distance of up to 1.5 meters (m). As a result of the methods described herein, the 500×300-micron rectangular beam has an irradiance of 30.6 GW/m$^2$, but the power needed is just 4.58 kW, thereby creating a savings of 24% in launched power.

The amount of energy applied per unit width can be calculated using the equation:

$$E=I*w*L^2/v$$

where I is irradiance in watts per square meter, w is the width, L is length in meters, and v is velocity. When using a rectangular beam, the applied energy is independent of the distance from the weld seam and the rie of damage from under and over exposure is reduced because the energy is uniformly distributed over the irradiated zone.

Also in accordance with the present disclosure is a 1 kW laser focused into a rectangular beam measuring 0.5 millimeters (mm) in length and 0.03 mm in width. In this embodiment, the resulting irradiance is 6.667 GW/m$^2$ (calculated by dividing 1 kW by 0.5 mm*0.03 mm). Further, in such an embodiment, for processing to occur, the sweep velocity may be set at approximately 0.1 meter per second (m/s). As a result, the amount of energy applied in this embodiment is 5 Joules (J) and the energy applied per unit area is 33.333 mega Joules per square meter (MJ/m$^2$). This is approximately one-third (33%) of the power required by a spherical top-hat beam under the same weld conditions.

The above descriptions are merely illustrative. Having thus described several aspects of at least one embodiment of this invention including the preferred embodiments, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A multi-wavelength beam combining laser system comprising:
   a first laser system comprising a first plurality of beam emitters each emitting a beam; a first directing optical element arranged to receive the first plurality of beams, and cause the chief ray of each beam to converge along a first beam combining dimension; a first dispersive element, positioned along the first beam combining dimension to receive and transmit the beams; and a first partially reflective output coupler arranged to receive the transmitted beams from the first dispersive element, to reflect a portion of the transmitted beams toward the first dispersive element, and to transmit a first multi-wavelength beam comprising optical radiation having a power and a first plurality of wavelengths;

a second laser system comprising a second plurality of beam emitters each emitting a beam; a second directing optical element, different from the first directing optical element, arranged to receive the second plurality of beams, and cause the chief ray of each beam to converge along a second beam combining dimension; a second dispersive element, different from the first dispersive element, positioned along the second beam combining dimension to receive and transmit the beams; and a second partially reflective output coupler, different from the first partially reflective output coupler, arranged to receive the transmitted beams from the second dispersive element, to reflect a portion of the transmitted beams toward the second dispersive element, and to transmit a second multi-wavelength beam, different from the first multi-wavelength beam, comprising optical radiation having a power and a second plurality of wavelengths; and optically downstream of the first and second partially reflective output couplers, at least one spacing optical element to reflect the first and second multi-wavelength beams and control a gap between the first and second multi-wavelength beams.

2. The multi-wavelength beam combining laser system of claim 1, further comprising an optical collimating element positioned between the first directing optical element and the first dispersive element.

3. The multi-wavelength beam combining laser system of claim 1, further comprising an optical collimating element positioned between the first diffractive element and the first output coupler.

4. The multi-wavelength beam combining laser system of claim 1, further comprising a multi-wavelength beam path adjuster positioned after the first output coupler and configured to modify the entrance angle of the first multi-wavelength beam into an optical fiber.

5. The multi-wavelength beam combining laser system of claim 1, wherein the gap controlled by the at least one spacing optical element is adjustable.

6. The multi-wavelength beam combining laser system of claim 5, wherein the at least one spacing optical element is configured to overlap the first and second multi-wavelength beams, resulting in a combined beam having a shape equivalent to that of the first multi-wavelength beam.

7. The multi-wavelength beam combining laser system of claim 5, wherein the at least one spacing optical element is configured to adjust the first and second-wavelength beams so they abut one another, resulting in a combined beam having a width equal to the sum of the widths of the first and second multi-wavelength beams.

8. The multi-wavelength beam combining laser system of claim 1, wherein the gap is a distance ranging between zero and one millimeter.

9. The multi-wavelength beam combining laser system of claim 1, wherein at least one of the first or second multi-wavelength beams is time delayed.

10. The multi-wavelength beam combining laser system of claim 1, wherein the power of at least one of the first or second multi-wavelength beams is adjustable.

11. The multi-wavelength beam combining laser system of claim 1, wherein the at least one spacing optical element comprises (i) disposed optically downstream of the first output coupler, a first mirror for receiving and reflecting the first multi-wavelength beam, and (ii) disposed optically downstream of the second output coupler, a second mirror, different from the first mirror, for receiving and reflecting the second multi-wavelength beam.

12. A multi-wavelength beam combining laser system comprising:

a plurality of beam emitters each emitting a beam;

a combining optical element arranged to receive the plurality of beams, and cause the chief ray of each beam to converge along a beam combining dimension, the combining optical element having a focal length;

a dispersive element, positioned along and configured for dispersion in the beam combining dimension, to receive the plurality of converging chief rays, and transmit the beams; and a partially reflective output coupler arranged to receive the transmitted beams from the dispersive element, to reflect a portion of the transmitted beams toward the dispersive element, and to transmit a multi-wavelength beam comprising optical radiation having a plurality of wavelengths, wherein an optical distance between the dispersive element and the combining optical element is greater than the focal length of the combining optical element.

13. The multi-wavelength beam combining laser system of claim 12, wherein transmitted multi-wavelength beam has a rectangular shape.

14. An adjustable beam quality multi-wavelength beam combining laser system comprising:

a plurality of beam emitters each emitting a beam;

a combining optical element arranged to receive the plurality of beams, and cause the chief ray of each beam to converge along a beam combining dimension;

a collimating optical element arranged to collimate the diverging rays of each beam emitted by the beam emitters;

a dispersive element, positioned along and configured for dispersion in the beam combining dimension, to receive the plurality of converging beams and collimated beams, and transmit the beams; and a partially reflective output coupler arranged to receive the transmitted beams from the dispersive element, to reflect a portion of the transmitted beams toward the dispersive element, and to transmit a multi-wavelength beam comprising optical radiation having a plurality of wavelengths, wherein (i) an optical distance between the combining optical element and the dispersive element is substantially equal to a focal length of the combining optical element, (ii) an optical distance between the combining optical element and the plurality of beam emitters is less than the focal length of the combining optical element, (iii) an optical distance between the collimating optical element and the plurality of beam emitters is substantially equal to a focal length of the collimating optical element, and (iv) an optical distance between the collimating optical element and the dispersive element is less than the focal length of the collimating optical element.

15. The laser system of claim 14, wherein the optical distance traveled by each beam between the beam emitters and the dispersive element is less than two times the focal length of the combining optical element.

16. The laser system of claim 14, further comprising a spatial combiner system positioned along a non-beam combining dimension and configured to provide feedback to each beam emitter from the partially-reflective output coupler along the non-beam combining dimension.

17. The laser system of claim 14, further comprising a beam path adjuster positioned after the partially reflective output coupler that is configured to modify an entrance angle of the multi-wavelength beam into an optical fiber.

18. The beam path adjuster of claim 17, wherein the beam path adjuster is automatically repositionable.

19. The laser system of claim 17, further comprising a focusing element positioned after the beam path adjuster configured to work with the beam path adjuster to modify the entrance angle of the multi-wavelength beam into the optical fiber.

20. A multi-wavelength beam combining laser system comprising:
   a plurality of beam emitters each emitting a beam;
   a combining optical element arranged to receive the plurality of beams, and cause the chief ray of each beam to converge along a beam combining dimension;
   a dispersive element, positioned along a beam combining dimension, to receive the plurality of converging chief rays, and transmit the beams, wherein the combining optical element is disposed optically downstream of the plurality of beam emitters and optically upstream of the dispersive element;
   a partially reflective output coupler arranged to receive the transmitted beams from the dispersive element, to reflect a portion of the transmitted beams toward the dispersive element, and to transmit a multi-wavelength beam comprising optical radiation having a plurality of wavelengths, wherein the optical distance each beam travels between the beam emitters and the dispersive element is less than two times a focal length of the combining optical element; and
   at least one diffractive element, positioned along the non-beam combining dimension and disposed optically downstream of the partially reflective output coupler, to receive the multi-wavelength beam and transmit a rectangular shaped beam.

* * * * *